Patented Mar. 4, 1952

2,587,576

UNITED STATES PATENT OFFICE 2,587,576

HIGHER ALCOHOLS FROM ALDEHYDES

Edmund Field, Chicago, Ill., and Bernard L. Hill, Hammond, Ind., assignors to Standard Oil Company, Chicago, Ill., a corporation of Indiana No Drawing. Application December 2, 1950, Serial No. 198,918

10 Claims. (Cl. 260—638)

This invention relates to a process of preparing primary alcohols from straight chain aldehydes. The invention relates more particularly to the preparation of primary alcohols having at least four carbon atoms per molecule from acetaldehyde, propionaldehyde or n-butyraldehyde.

The preparation of higher alcohols from aldehydes has long been accomplished by effecting the well-known aldol condensation of the aldehydes. The condensation results in a non-saturated aldehyde that is subsequently hydrogenated in the presence of one of the common metallic hydrogenation catalysts that are well known to be susceptible to catalyst poisons such as sulfur or carbon monoxide. Heretofore aldol condensation and the hydrogenation have been effectively carried out in one step only by the employment of a highly sulfur sensitive palladium catalyst, cf. Smith U. S. 2,485,989, issued October 25, 1949.

An object of the invention is the preparation of primary alcohols that are hydrogenated condensation products of lower molecular weight aldehydes by a simple method employing an economical and readily available sulfur-resistant catalyst. Another object of the invention is the provision of an improved process for preparing primary alcohols having principally from four to eight carbon atoms per molecule and to a lesser extent of primary alcohols having up to about sixteen carbon atoms per molecule. Other objects will appear in the following specification and claims.

According to the invention, normal aldehydes having two to four carbon atoms per molecule, or two or more of these aldehydes, are subjected to a temperature between about 120° and 200° C. and a gauge pressure of 1,000 to 10,000 pounds per square inch in the presence of carbon monoxide and hydrogen in a mol ratio of about 2:1 to 1:4 and about 0.01 to 0.2 gram atoms of cobalt, per mol of reactant aldehyde, as a cobalt carbonyl or cobalt hydrocarbonyl. When the above reactants are maintained under these conditions long enough so that a mol velocity of not greater than ten mols of aldehyde per hour per gram atom of cobalt is established, reaction of the said reactants provides a product containing hydrogenation-condensation products of the aldehydes. An important product in each instances is an alcohol containing twice the number of carbon atoms per molecule as the employed aldehyde. For example, acetaldehyde will produce some normal butanol, propionaldehyde will produce primarily hexanol and normal butyraldehyde will produce octyl alcohol. Under the above conditions, isobutyraldehyde and aldehydes having more than four carbon atoms per molecule do not provide the condensation products to any substantial extent. The hydrogenation-condensation of acetaldehyde will also produce primary alcohols that contain three or four mols of acetaldehyde; a particularly substantial yield of hexanols and octanols can be obtained in this synthesis. N-butyraldehyde, on the other hand, has less tendency to form higher alcohol products and predominantly produces the octyl alcohol, 2-ethyl-1-hexanol.

The cobalt carbonyls and hydrocarbonyls (cobalt hydrocarbonyl and hydrocarbonyl complexes) can be preformed and used directly or else a water soluble potential catalyst, such as cobalt acetate or cobalt sulfate, or a water insoluble potential catalyst, such as cobalt or cobalt oxide, can be used. The cobalt carbonyl and hydrocarbonyl catalyst will form from these potential catalysts under reaction conditions. The employment of a sulfur compound and a solvent will lower the initiation temperature and hasten the reaction in a manner similar to that disclosed and claimed in applicants' copending application Serial No. 124,474, filed October 29, 1949. The initiation of the reaction is not as difficult nor is the initial reaction temperature as high as it is when the hydrocarbon reactant is an olefin of about seven to nine carbon atoms per molecule. As shown in the copending application, the hydrogenation of aldehydes and their condensation products above about six carbon atoms per molecule requires the use of temperatures above about 150° C. Hydrogenation of the lower aldehydes proceeds at temperatures even below 140° C.

It has been found that the addition of water to the reaction enhances the tendency of these aldehydes to form the condensation products and tends to push the reaction toward the formation of higher alcohols. Thus water is particularly useful with butyraldehyde where it is desirable to avoid the formation of butanol and to increase the yield of octyl alcohols. Water can also be the solvent medium for the reaction and is particularly convenient when a water-soluble potential catalyst is employed.

The solvent for the reaction can be any hydrocarbon solvent; among the solvents that can be employed are ether, paraffins or aromatic solvents either with or without added water. The use of an aromatic solvent strikingly increases the rate of reaction at a given temperature. In test runs of the new process, the rate of reaction was measured by the consumption of hydrogen and the consequent reduction of reactor pressure. This rate of decrease was increased by a factor of two and total gas consumption was also doubled, when toluene instead of diethyl ether was used as a solvent.

The process can be readily operated either batchwise or continuously. Carbon monoxide and hydrogen in a prescribed ratio is introduced into an autoclave or bomb, having a stirrer or shaking means. The selected aldehyde is introduced as a liquid into the autoclave and can be dispersed in water or a hydrocarbon, preferably an aromatic hydrocarbon solvent.

The catalyst can be added as preformed cobalt carbonyl or hydrocarbonyl or as an aqueous cobalt salt in a solution of water or in suspension in oil, or as a water insoluble compound such as cobalt oxide or as a slurry or dust of finely divided metallic cobalt. If the catalyst is not preformed, from 0.1 to 5 per cent of an inorganic sulfur compound, for example ammonium sulfide or hydrogen sulfide, that will convert cobalt or a cobalt compound under reaction conditions to cobalt sulfide is introduced into the reaction zone to ensure initial reaction and conversion of potential catalyst to actual catalyst. The actual catalyst can be formed in situ by introducing hydrogen and carbon monoxide into the reaction zone before introduction of the aldehyde, or it can be formed during the progress of the reaction. The former method is preferred because it provides enhanced reaction rates and reduces the time that the feed or the reaction product is subjected to those elevated temperatures which tend to cause decomposition or side reactions.

Carbon monoxide and hydrogen are maintained in the reaction zone at a gauge pressure of 1,000 to 10,000 pounds per square inch. The progress of the reaction can be determined by a measure of the decrease in gauge pressure that is caused by the consumption of the theoretical amount of one mol of hydrogen per mol of aldehyde and, to a considerably lesser extent, by polymerization of the aldehyde. Reaction is continued for several hours, preferably at least two hours; thereafter the product is chilled and is permitted to separate into an oil and water layer. The product can be acid-washed to separate cobalt catalyst from the oil layer and provide an aqueous solution of the cobalt as a salt. This solution can be concentrated or the salt can be converted to, for example, cobalt naphthenate and be dissolved in an oil before recycling.

As the hydrogenation-condensation process is essentially one-step, its adaptability to a continuous process can be simply made. Carbon monoxide and hydrogen can be flowed under pressure into contact with the aldehyde, or the aldehyde dissolved in a solvent, and in the presence of the cobalt carbonyl and hydrocarbonyl catalyst. After suitable contact has been made the unreacted gases and the product oils and water can be separately and continuously removed from the reaction zone. The reaction product can be treated as hereinbefore described for removal of catalyst and can thereafter be continuously fractionated. Unreacted feed stock can be recycled from the fractionator to the reaction zone.

The following specific examples will illustrate the hydrogenation-condensation of acetaldehyde, propionaldehyde and n-butyraldehyde.

Example I

A bomb having a capacity of 100 cc. and an automatic stirring means was charged with 30 cc. of ethyl ether, two grams of cobalt oxide and 0.1 cc. of an ammonium sulfide solution. Cobalt carbonyl and hydrocarbonyl catalyst were preformed by treatment with carbon monoxide and hydrogen in a mol ratio of 1:1 under a pressure of 2,000 pounds per square inch gauge and at a temperature of 160° C. The bomb was then cooled and was charged with 20 milliliters of acetaldehyde. Carbon monoxide and hydrogen were again introduced, the bomb heated to 160° C. and pressure was maintained at about 2,000 pounds per square inch by the addition of makeup gas during the course of the reaction. Although reaction began at 120° C., the temperature was maintained at about 160° C. for the major portion of the reaction period. When the reaction was about three-quarters finished, hydrogen alone was substituted for carbon monoxide and hydrogen in the makeup gas in order to avoid reduction of the hydrogen concentration in the bomb. Total reaction time was seven hours. The product was washed free of cobalt with dilute $H_2SO_4$ at 30° C., extracted with ether, dried and fractionally distilled. The product contained 11 percent ethanol, 20 percent n-butanol, 30 percent 2-methyl-1-pentanol and a balance of bottom distillation products.

Example II

Instead of employing acetaldehyde as in the preceding example, in this case 0.34 gram mol of paraldehyde was employed. Cobalt carbonyl and hydrocarbonyl catalyst were preformed by treatment of cobaltic oxide with carbon monoxide and hydrogen at 160° C. and 2,000 pounds per square inch gauge pressure and in the presence of 0.1 cc. of ammonium sulfide solution and 30 cc. of ethyl ether. Freshly distilled paraldehyde was then charged to a 100 cc. automatically stirred bomb. Pressure on the bomb was maintained at about 1,600 to 2,000 pounds per square inch gauge by the intermittent addition of carbon monoxide and hydrogen in a 1:1 ratio for half the reaction period and then of hydrogen only for the last half. After seven hours reaction plus an additional seven hours when no appreciable gas consumption was observed, the reaction mixture was cooled and product was removed from the bomb and washed with dilute $H_2SO_4$ to remove the cobalt. The product was then subjected to a continuous ether extraction. The ether layer was then dried and fractionally distilled. The distillation indicated a product distribution of 2 percent ethanol, 11 percent butanol, about 38 percent mixed hexanols, about 34 percent mixed octanols and 15 percent higher boiling products.

Example III

In this example propionaldehyde was used as the aldehyde. A mixture consisting of 19 cc. of propionaldehyde, 17 cc. of ethyl ether, 2.0 grams of $Co_2O_3$ and 0.1 cc. of ammonium sulfide solution was charged to a 100 cc. capacity stirred reactor. The reaction was carried out at a temperature of approximately 160° C. and under a pressure of carbon monoxide and hydrogen in a ratio of approximately 1:1 maintained at about 2,000 pounds per square inch gauge. After reaction for twenty hours the product was cooled, acid washed, ether extracted, dried and distilled. No propanol was detected. The product contained 70 percent of 2-methyl-1-pentanol and the balance was column hold-up and bottoms. The alcohol was refractionated in an 80 plate column at a 50 to 1 reflux ratio. Ninety percent of the sample boiled at 147.6 to 148.2° C./760 mm. with a $n_D^{20}$ of 1.4177 to 1.4180 and a density of 0.8284 at 25° C., thus establishing the alcohol as 2-methyl-1-pentanol.

*Example IV*

A mixture consisting of 17.5 cc. of freshly fractionated n-butyraldehyde, 15 cc. of water, 15 cc. of toluene, 2.0 grams of cobaltic oxide and 0.1 cc. of ammonium sulfide solution was charged into a stirred reactor. Reaction was carried out at a temperature of 160° C. under a pressure of approximately 2,000 pounds per square inch gauge of carbon monoxide and hydrogen initially in a mol ratio of 1:1.

At one time during the reaction period, the reactor and contents were cooled to room temperature, the unreacted gases were purged, and carbon monoxide and hydrogen in the said ratio of 1:1 were again charged into the reactor. The consumption of hydrogen during reaction is such that, in spite of the said purging and replenishing step, the unreacted gases, upon completion of reaction, contained only one mol of hydrogen to 3.5 mols of carbon monoxide. Reaction was essentially complete after thirteen hours. The product was diluted with n-hexane and washed free of cobalt with dilute $H_2SO_4$. The reaction products were cooled, and removed from the bomb.

Fractionation of the product yielded 8 percent butanol, 47 percent of 2-ethyl-1-hexanol and 45 percent higher boiling materials plus holdup. The structure of the 2-ethyl-1-hexanol was established by hydroxyl number, boiling point, refractive index and specific gravity.

The synthesis was repeated with the exception that no water was employed. The absence of water resulted in an increase in butanol yield from 8 percent, obtained above, to 46 percent, with a corresponding decrease in the yield of higher molecular weight alcohols. It was observed, however, that propionaldehyde gives good yields of hexanol in the presence or absence of water.

*Example V*

To a one liter stainless steel mechanically stirred autoclave, 200.1 grams of freshly distilled n-butyraldehyde was added, together with 268.5 grams of an aqueous solution containing 13.4 grams of cobalt as the acetate. The reactor was then heated to 166° C. under a pressure of 3,000 pounds per square inch of a gas containing one mol of hydrogen per mol of carbon monoxide. Total reaction time was six hours, including a three and one-quarter hour induction period. The crude product was first steam distilled to remove cobalt and then fractionated. On the basis of the weight of the aldehyde charged to the autoclave, 0.7 percent was unreacted, 7.1 percent was hydrogenated to butanol, 13.4 percent was converted to 2-ethyl-1-hexanal and 61.2 percent was converted to 2-ethyl-1-hexanol. A longer reaction time would have converted the ethyl-hexanal to alcohol as well.

It was attempted to effect a hydrogenation-condensation reaction of isobutyraldehyde under conditions substantially identical to those employed in the specific examples but no octyl alcohol was found and in fact, at least 90 percent of the product consisted of isobutanol. When heptanoic aldehyde was used, the product consisted entirely of n-heptanol and heavy bottoms.

Two or more of the aldehydes, acetaldehyde, propionaldehyde, and n-butyraldehyde, can be together subjected to the hydrogenation-condensation reaction. This presents means for obtaining alcohols containing groups from two different aldehydes, for example amyl alcohols from acetaldehyde and propionaldehyde or hexyl alcohols from acetaldehyde and n-butyraldehyde.

Having described our invention, we claim the following:

1. A process of preparing, from normal aldehydes having from two to four carbon atoms per molecule, primary alcohols having at least twice as many carbon atoms per molecule as the source aldehyde, the said process comprising admixing, with a said aldehyde, carbon monoxide and hydrogen in a mol ratio between 2:1 and 1:4 in the presence, as catalyst, of at least one of the group consisting of cobalt carbonyls and hydrocarbonyls, maintaining the said aldehyde and gases at a temperature between 120° and 200° C. and under a pressure between about 1,000 and 10,000 pounds per square inch thus effecting a condensation-hydrogenation of the aldehyde, separating catalyst from product oil, and fractionating the product to obtain a polymeric primary-alcohol derivative having at least twice as many carbon atoms per molecule as the employed aldehyde.

2. The process of claim 1 in which there is employed for each mol of treated aldehyde from 0.01 to 0.2 gram atoms, calculated as cobalt, of the catalyst.

3. The process of claim 1 in which the aldehyde is acetaldehyde.

4. The process of claim 1 in which the aldehyde is propionaldehyde.

5. The process of claim 1 in which the aldehyde is n-butyraldehyde.

6. A process of making primary alcohols from normal aldehydes having from two to four carbon atoms per molecule, the said process comprising contacting a said aldehyde and a solvent with carbon monoxide and hydrogen in a mol ratio between 2:1 and 1:4 in the presence, as catalyst, of 0.01 to 0.2 gram atoms calculated as cobalt per mol of aldehyde, of at least one of the group consisting of cobalt carbonyls and hydrocarbonyls, maintaining the said aldehyde and the gases at a temperature between 120° and 200° C., under a pressure between about 1,000 and 10,000 pounds per square inch, and for a time period that will establish a mol velocity as mols of aldehyde per hour per gram atom of cobalt of less than 10 thus effecting a condensation-hydrogenation of the aldehyde, separating catalyst from product oil and fractionating the product to obtain a polymeric primary-alcohol derivative of the said aldehyde.

7. The process of claim 6 in which the said solvent is water.

8. The process of claim 6 in which the said solvent is aromatic hydrocarbon.

9. The process of claim 6 in which the said solvent comprises water and an aromatic hydrocarbon.

10. A process of making primary alcohols having from four to twelve carbon atoms per molecule from normal aldehydes having from two to four carbon atoms per molecule, the said process comprising: admixing potential cobalt catalyst with a solvent and from 0.1 to 5 percent of an inorganic sulfur compound that is effective to convert cobalt to cobalt sulfide under reaction conditions, and subjecting the same to a superatmospheric pressure of carbon monoxide and hydrogen at a temperature of at least 150° C. so as to convert the potential cobalt catalyst to an actual cobalt catalyst that is at least one of the group consisting of cobalt carbonyls and cobalt hydrocarbonyls; introducing said active catalyst into contact with said normal aldehyde in the quantity of 0.01 to 0.2 gram atoms of catalyst cobalt per mol of aldehyde; maintaining the said aldehyde and the gases at a temperature between 120° and 200° C. and under a pressure between about 1,000 to 10,000 pounds per square inch to effect a condensation-hydrogenation of the aldehyde; separating catalyst from product oil; and fractionating the product oil to obtain a polymeric primary-alcohol derivative of the said aldehyde.

EDMUND FIELD.
BERNARD L. HILL.

REFERENCES CITED

The following references are of record in the file of this patent:

UNITED STATES PATENTS

| Number | Name | Date |
| --- | --- | --- |
| 2,119,899 | Zorn | June 7, 1938 |
| 2,327,066 | Roelen | Aug. 17, 1943 |
| 2,334,761 | Hanford et al. | Nov. 23, 1943 |
| 2,485,989 | Smith | Oct. 25, 1949 |